(12) United States Patent
Jung et al.

(10) Patent No.: US 8,374,112 B2
(45) Date of Patent: Feb. 12, 2013

(54) METHOD AND APPARATUS FOR TRANSMITTING AND RECEIVING FEEDBACK INFORMATION IN A COMMUNICATION SYSTEM INCLUDING USER TERMINALS WITH DIFFERENT NUMBERS OF ANTENNAS

(75) Inventors: Young-Ho Jung, Goyang-si (KR); Byung-Gun Kim, Seoul (KR)

(73) Assignee: Industry University Cooperation Foundation—Korea Aerospace University, Goyang-si (KR)

( * ) Notice: Subject to any disclaimer, the term of this patent is extended or adjusted under 35 U.S.C. 154(b) by 292 days.

(21) Appl. No.: 12/722,807

(22) Filed: Mar. 12, 2010

(65) Prior Publication Data
US 2010/0232339 A1 Sep. 16, 2010

(30) Foreign Application Priority Data
Mar. 13, 2009 (KR) ........................ 10-2009-0021892

(51) Int. Cl.
*H04H 20/71* (2008.01)
(52) U.S. Cl. ...................................... 370/312
(58) Field of Classification Search .................. 370/203, 370/204–215, 229–253, 310–337, 338–350, 370/395.1, 395.3, 395.4, 395.41, 395.42, 370/395.5, 395.52, 395.53, 412–421, 431–529, 370/523–520
See application file for complete search history.

(56) References Cited

U.S. PATENT DOCUMENTS

| | | | | |
|---|---|---|---|---|
| 7,143,330 B2 * | 11/2006 | Ahn et al. | ...................... | 714/748 |
| 7,181,170 B2 * | 2/2007 | Love et al. | ................. | 455/67.13 |
| 7,433,328 B2 * | 10/2008 | Kim et al. | ...................... | 370/278 |
| 7,440,399 B2 * | 10/2008 | Julian et al. | .................... | 370/230 |
| 7,586,834 B2 * | 9/2009 | Byun et al. | ..................... | 370/208 |
| 7,593,486 B2 * | 9/2009 | Jeong et al. | ..................... | 375/324 |
| 7,751,382 B2 * | 7/2010 | Ranta-Aho et al. | ........... | 370/345 |
| 7,770,086 B2 * | 8/2010 | Mauritz et al. | ................. | 714/748 |
| 7,924,754 B2 * | 4/2011 | Bergman et al. | .............. | 370/310 |
| 7,984,356 B2 * | 7/2011 | Chindapol et al. | ............. | 714/748 |
| 7,986,680 B2 * | 7/2011 | Kim et al. | ...................... | 370/341 |
| 7,990,911 B2 * | 8/2011 | Sutivong et al. | .............. | 370/328 |
| 8,014,352 B2 * | 9/2011 | Tiirola et al. | .................. | 370/329 |
| 8,031,643 B2 * | 10/2011 | Kwak et al. | ..................... | 370/278 |
| 8,064,370 B2 * | 11/2011 | Shirakata et al. | .............. | 370/278 |
| 8,068,457 B2 * | 11/2011 | Pi et al. | .......................... | 370/329 |
| 8,077,596 B2 * | 12/2011 | Naguib et al. | ................. | 370/208 |
| 2003/0131299 A1 * | 7/2003 | Ahn et al. | ...................... | 714/748 |
| 2005/0138671 A1 * | 6/2005 | Love et al. | ...................... | 725/123 |
| 2005/0180328 A1 * | 8/2005 | Kim et al. | ...................... | 370/236 |
| 2005/0276317 A1 * | 12/2005 | Jeong et al. | ..................... | 375/213 |
| 2005/0286402 A1 * | 12/2005 | Byun et al. | ..................... | 370/203 |

(Continued)

*Primary Examiner* — Kwang B Yao
*Assistant Examiner* — Jung-Jen Liu
(74) *Attorney, Agent, or Firm* — Jefferson IP Law, LLP

(57) ABSTRACT

A method and apparatus is provided for transmitting feedback information by each of user terminals in a communication system including the user terminals with different numbers of antennas. A multicast data packet is received from a base station through a downlink multicast transmission channel. If the multicast data packet has never been successfully decoded before, the multicast data packet is decoded and the success/failure in decoding the multicast data packet is determined. Upon the failure in decoding the multicast data packet, a NACK signal indicating the failure in decoding the multicast data packet is generated with sequences, the number of which is equal to the number of antennas of the user terminal. The NACK signal is transmitted to the base station through a shared feedback channel. If the user terminal has at least two antennas, sequences corresponding to the at least two antennas are orthogonal to each other and constitute sequence signals.

4 Claims, 4 Drawing Sheets

U.S. PATENT DOCUMENTS

| | | | |
|---|---|---|---|
| 2006/0133273 A1* | 6/2006 | Julian et al. | 370/230 |
| 2007/0147253 A1* | 6/2007 | Sutivong et al. | 370/236 |
| 2007/0245205 A1* | 10/2007 | Popovski et al. | 714/749 |
| 2008/0153371 A1* | 6/2008 | Losch et al. | 442/118 |
| 2008/0155371 A1* | 6/2008 | Mauritz et al. | 714/748 |
| 2008/0311939 A1* | 12/2008 | Hugl et al. | 455/507 |
| 2009/0028107 A1* | 1/2009 | Julian et al. | 370/329 |
| 2009/0070650 A1* | 3/2009 | Bourlas et al. | 714/748 |
| 2009/0175220 A1* | 7/2009 | Yi et al. | 370/328 |
| 2010/0042881 A1* | 2/2010 | Wong | 714/748 |
| 2010/0110878 A1* | 5/2010 | Frederiksen et al. | 370/216 |
| 2010/0246463 A1* | 9/2010 | Papasakellariou et al. | 370/311 |
| 2011/0149945 A1* | 6/2011 | Nakao et al. | 370/344 |
| 2011/0200016 A1* | 8/2011 | Bergman et al. | 370/335 |
| 2012/0033587 A1* | 2/2012 | Papasakellariou et al. | 370/277 |
| 2012/0034927 A1* | 2/2012 | Papasakellariou et al. | 455/450 |

\* cited by examiner

METHOD AND APPARATUS FOR TRANSMITTING AND RECEIVING FEEDBACK INFORMATION IN A COMMUNICATION SYSTEM INCLUDING USER TERMINALS WITH DIFFERENT NUMBERS OF ANTENNAS

PRIORITY

This application claims the benefit under 35 U.S.C. §119(a) of a Korean Patent Application filed in the Korean Intellectual Property Office on Mar. 13, 2009 and assigned Serial No. 10-2009-0021892, the entire disclosure of which is hereby incorporated by reference.

BACKGROUND OF THE INVENTION

1. Field of the Invention

The present invention relates to a method and apparatus for transmitting and receiving feedback information of a user terminal in a communication system including user terminals with different numbers of antennas.

2. Description of the Related Art

With the recent increasing demand for services that transmit the same multimedia data packets to multiple user terminals, communication-broadcasting convergence technologies and services are under scrutiny, which take advantage of merits and make up for defects of communication networks and broadcasting networks. Technologies for improving the efficiency of broadcasting and multicast transmission in the communication network may include Multimedia Broadcast and Multicast Service (MBMS) which has been standardized in 3rd Generation Partnership Project (3GPP), and Multicast and Broadcast Service (MBS) which has been standardized in IEEE 802.16.

MBMS is a service of simultaneously transmitting the same data packets to multiple user terminals. That is, multiple user terminals using MBMS simultaneously transmit the same data packets through one link. MBMS is similar to Cell Broadcast Service (CBS). While CBS is a low-speed message-based service, MBMS is a service aimed at high-speed multimedia data packet transmission based on Internet Protocol (IP) multicast transmission. Advantageously, therefore, MBMS can increase the efficiency of resource use, and user terminals using the same can use multimedia services on the cheap.

MBMS can be divided into multi-cell based MBMS and single-cell based MBMS.

In multi-cell based MBMS, multiple base stations transmit the same data packets based on a Single Frequency Network (SFN). Then, user terminals can obtain a macro diversity gain by soft-combining the data packets received from the multiple base stations. Due to these characteristics, multi-cell based MBMS is advantageous for data packet transmission of a broadcast type that uses only the downlink. Disadvantageously, however, multi-cell based MBMS can hardly guarantee Quality of Service (QoS) on a user terminal basis. Therefore, multi-cell based MBMS is not often used for transmitting different multicast data packets on a region basis.

Single-cell based MBMS has emerged to make up for defects of multi-cell based MBMS, i.e., to guarantee QoS of individual user terminals. Single-cell based MBMS guarantees QoS of each of user terminals included in a multicast group by applying Hybrid Automatic Retransmit ReQust (H-ARQ) or the like. To this end, a base station should receive feedback information from individual user terminals included in the multicast group. The feedback information is an ACK/NACK signal indicating the success/failure in decoding a data packet multicasted from the base station. Accordingly, there is a need for a feedback channel over which the user terminals included in the multicast group can transmit the feedback information to the base station.

An individual allocation method of allocating an ACK/NACK channel for unicast transmission to respective terminals and a shared feedback channel method of using an On-Off Keying (OOK) modulation technique may be considered as a method of allocating the feedback channel. In the shared feedback channel method, user terminals in a group share one feedback channel. Therefore, even if the number of user terminals increases, the required feedback channel resource does not increase.

Meanwhile, it is general that in OOK modulation, an ACK signal is not separately transmitted, since it is considered an Off signal of a NACK signal.

The base station, which has received feedback information, is interested only in determining whether at least one of user terminals included in the multicast group has failed to succeed in decoding the multicasted data packet, rather than in determining whether the individual user terminals have succeeded in decoding the data packet. That is, the base station only needs to know whether there is any user terminal that transmitted a NACK signal, in the multicast group. Therefore, each user terminal does not transmit an ACK signal upon successful decoding, and transmits a NACK signal only upon decoding failure. The base station synthesizes NACK signals that are received from the user terminals through the shared feedback channel, using the OOK modulation technique. The signal synthesized by means of the OOK modulation technique is used to determine the presence of any user terminal that transmitted a NACK signal, using an energy detection technique.

Since the foregoing shared feedback channel method uses one shared feedback channel based on the OOK modulation technique without allocating individual feedback channels to user terminals, there is no additionally required resource despite an increase in the number of user terminals. In addition, since the increase in the number of user terminals increases energy of the synthesized signal, miss detection of a signal may be reduced. Hence, the shared feedback channel method is superior in efficiency compared to the individual allocation method as the number of user terminals in the multicast group increases.

The shared feedback channel method can get a good performance when orthogonal sequences are used in a communication system using multiple antennas. Actually, when the shared feedback channel method is used, user terminals with a single antenna and user terminals with multiple antennas may be used in a mixed way due to, for example, the price issues of user terminals in the cell group. In the worst case, only one user terminal with a single antenna may exist in the group. The base station, however, may not determine whether the one user terminal has a single antenna or multiple antennas. Therefore, the base station requires performance of a specific level or more, just in case of existence of only the user terminal with a single antenna.

Specifically, if a base station constructed to receive feedback information in the form of orthogonal sequences receives the feedback information from only one user terminal with a single antenna, its performance may degrade significantly.

Conversely, even when a base station configured to receive feedback information from only the terminals with a single antenna receives the feedback information from user terminals with multiple antennas, the base station may suffer from performance degradation.

SUMMARY OF THE INVENTION

An aspect of the present invention is to address at least the above-mentioned problems and/or disadvantages and to provide at least the advantages described below. Accordingly, an aspect of the present invention provides a method and apparatus for transmitting and receiving feedback information in a communication system including user terminals with different numbers of antennas.

Another aspect of the present invention provides a method and apparatus for generating feedback information of a specific user terminal using a shared feedback channel method in a communication system including user terminals with different numbers of antennas.

A further another aspect of the present invention provides a method and apparatus for generating feedback information and transmitting it to a base station so that user terminals with a single antenna may be distinguished from user terminals with multiple antennas.

Yet another aspect of the present invention provides a method and apparatus for efficiently detecting feedback information by comparing an energy value of the feedback information with each of thresholds corresponding to the number of antennas of a user terminal.

In accordance with one aspect of the present invention, there is provided a method for transmitting feedback information by each of user terminals in a communication system including the user terminals with different numbers of antennas. The method includes receiving a multicast data packet from a base station through a downlink multicast transmission channel; decoding the multicast data packet and determining success/failure in decoding the multicast data packet, if the multicast data packet has never been successfully decoded before; upon the failure in decoding the multicast data packet, generating a NACK signal indicating the failure in decoding the multicast data packet with sequences, the number of which is equal to the number of antennas of the user terminal; and transmitting the NACK signal to the base station through a shared feedback channel. If the user terminal has at least two antennas, feedback sequences corresponding to the at least two antennas are mutually orthogonal.

In accordance with another aspect of the present invention, there is provided a method for receiving feedback information by a base station in a communication system including user terminals with different numbers of antennas. The method includes transmitting a data packet to the user terminals through a downlink multicast transmission channel; receiving feedback information indicating success/failure in decoding the data packet through a shared feedback channel from at least one user terminal that has received the data packet, among the user terminals; detecting from the feedback information each of sequences, the number of which is equal to the largest number n (where n is an integer greater than or equal to 2) among the numbers of antennas of the at least one user terminal; calculating an energy value of each of the detected sequences, calculating a first energy determined by adding up all the calculated energy values, and then comparing the first energy with a first threshold; and determining the feedback information as a NACK signal, if the first energy exceeds the first threshold. The first threshold is determined considering n transmit antennas and corresponding feedback sequences, the first energy is a sum of correlator outputs correspond to n different sequences, and the sequences are mutually orthogonal.

In accordance with a further another aspect of the present invention, there is provided an apparatus for transmitting feedback information in a communication system. The apparatus includes user terminals having different numbers of antennas, wherein each of the user terminals receives a multicast data packet from a base station through a downlink multicast transmission channel, decodes the multicast data packet and determines success/failure in decoding the multicast data if the multicast data packet has never been successfully decoded before, generates a NACK signal indicating the failure in decoding the multicast data packet with sequences, the number of which is equal to the number of antennas of the user terminal upon the failure in decoding the multicast data packet, and transmits the NACK signal to the base station through a shared feedback channel; wherein if the user terminal has at least two antennas, feedback sequences corresponding to the at least two antennas are mutually orthogonal.

In accordance with yet another aspect of the present invention, there is provided an apparatus for receiving feedback information in a communication system including user terminals with different numbers of antennas. The apparatus includes a base station for transmitting a data packet to the user terminals through a downlink multicast transmission channel, receiving feedback information indicating success/failure in decoding the data packet from at least one user terminal that has received the data packet, among the user terminals, through a shared feedback channel, detecting from the feedback information each of sequences, the number of which is equal to the largest number n (where n is an integer greater than or equal to 2) among the numbers of antennas of the at least one user terminal, calculating an energy value of each of the detected sequences, calculating a first energy determined by adding up all the calculated energy values, comparing the first energy with a first threshold, and determining the feedback information as a NACK signal if the first energy exceeds the first threshold; wherein the first threshold is determined considering n transmit antennas corresponding feedback sequences, the first energy is a sum of correlator outputs correspond to n different sequences, and the sequences are mutually orthogonal.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

Preferred embodiments of the present invention will now be described in detail with reference to the annexed drawings.

In the following description, a detailed description of known functions and configurations incorporated herein has been omitted for clarity and conciseness. Terms used herein are defined based on functions in the present invention and may vary according to users, operators' intention or usual practices. Therefore, the definition of the terms should be made based on contents throughout the specification.

The present invention provides a method and apparatus in which user terminals transmit feedback information to a base station over a shared feedback channel in multicast transmission based on a shared feedback channel method. Herein, it is assumed that each of the user terminals has a single antenna or multiple antennas.

In the present invention, if the feedback information is a NACK signal, user terminals generate the NACK signal with sequences, the number of which is equal to the number of their antennas. To be specific, a user terminal with a single antenna generates feedback information with a sequence in the form of a general On-Off Keying (OOK) signal, and a user terminal with multiple antennas generates feedback information with orthogonal sequences associated with the multiple antennas. If the feedback information is an ACK signal, no signal is transmitted to the base station.

The base station receiving the feedback information includes correlators corresponding to the number of multiple antennas of the user terminals. Upon receiving feedback information from user terminals, the base station detects the received feedback information based on an energy detection process proposed by the resent invention. To be specific, the energy detection process includes a multi-step comparison procedure of using a first threshold determined considering user terminals with multiple antennas and other thresholds determined considering user terminals with less number of antennas. The multi-step comparison procedure will be described in detail with reference to FIG. 2. The total number of steps and the number of thresholds in the comparison procedure are equal to the number of antennas of the user terminal having the maximum number of antennas among the user terminals existing in the communication system.

Figure 1:
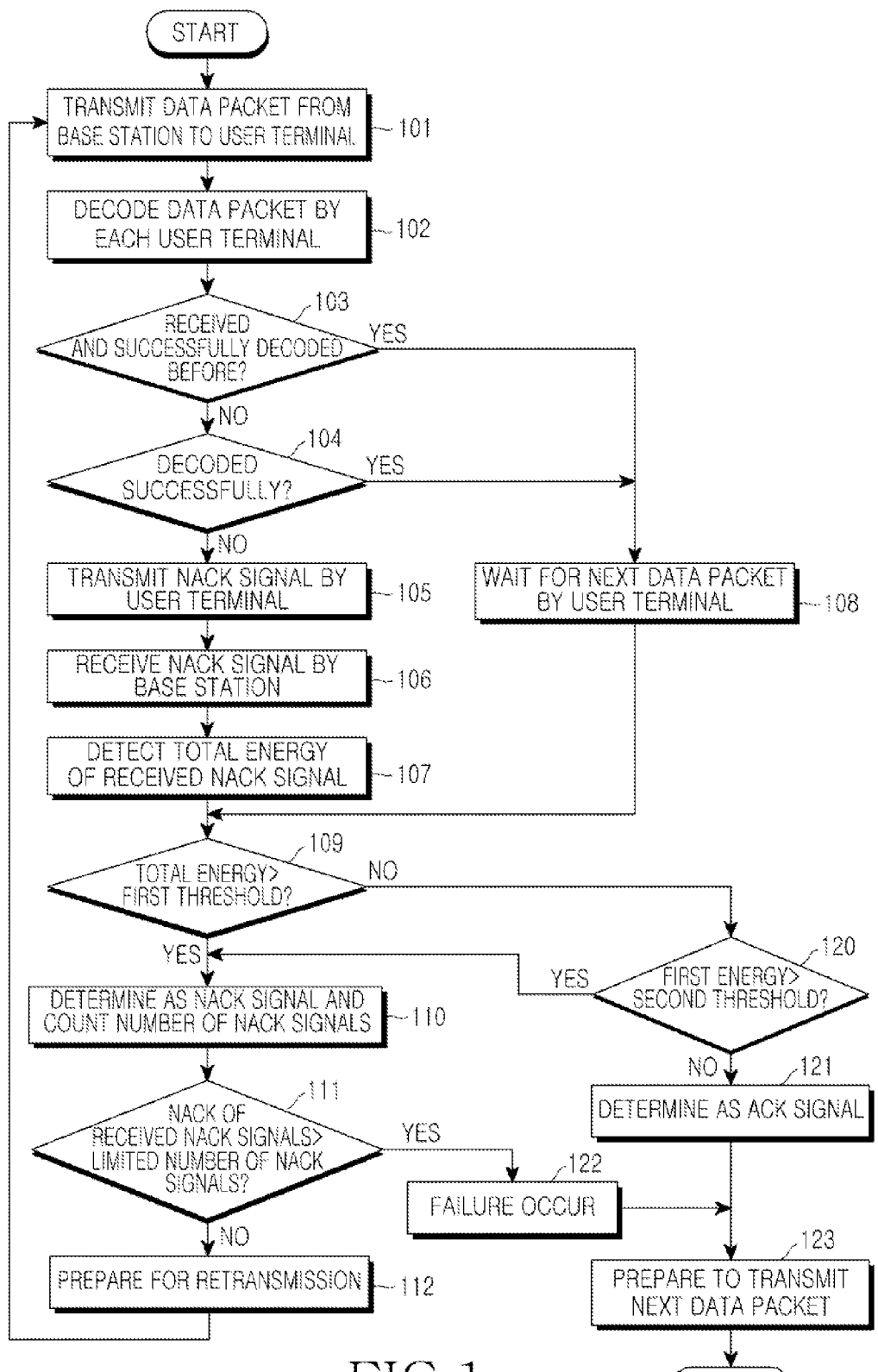
FIG. 1 is a flowchart showing an operation in a shared feedback channel between at least one user terminal and a base station according to an embodiment of the present invention.

FIG. 1 shows an operation in a shared feedback channel between at least one user terminal and a base station according to an embodiment of the present invention. Herein, it is assumed that the at least one user terminal has multiple antennas, i.e., 2 antennas, so the base station includes two correlators corresponding to the two antennas. However, the same operation is possible even for other cases.

Referring to FIG. 1, in step 101, the base station transmits the same data packet to user terminals located in its cell through a downlink multicast transmission channel.

In step 102, each of the user terminals receiving the same data packet decodes the received same data packet. An arbitrary user terminal among the user terminals checks in step 103 whether the same data packet has ever been received and successfully decoded before. This is because in the case where the received same data packet is a retransmitted data packet, if it has been received and successfully decoded before, there is no need to decode again the data packet and determine the success/failure in decoding. For example, let's assume that the received same data packet is a data packet that has been received and successfully decoded before. Also, let's assume that the user terminal decodes again the received same data packet, without the checking step of step 103. In this case, an ACK signal indicating the success in decoding the received same data packet has already been transmitted to the base station. However, if the re-decoding is failed, the user terminal may retransmit a NACK signal for the received same data packet to the base station, causing a possible reduction in the entire throughput. So, the checking step of step 103 is needed.

If it is checked in step 103 that the received same data packet has ever been received and successfully decoded before, the user terminal waits for the next data packet in step 108, without separately transmitting an ACK signal.

However, if it is checked in step 103 that the received same data packet has never been received and successfully decoded before, i.e., if it is an initial transmitted data packet, the user terminal decodes the received same data packet and then determines the success/failure in the decoding in step 104. Upon successful decoding, the user terminal proceeds to step 108.

Upon decoding failure, the user terminal transmits a NACK signal for the received same data packet to the base station through the shared feedback channel in step 105. The NACK signal is transmitted considering the number of antennas of the user terminal. To be specific, if the user terminal has a single antenna, the user terminal generates the NACK signal with a sequence in the form of a general OOK signal. If the user terminal has multiple antennas, the user terminal generates the NACK signal with orthogonal sequences associated with the multiple antennas.

In step 106, the base station receives a NACK signal by monitoring the shared feedback channel. In step 107, the base station measures the total energy value of the received NACK signal based on the energy detection method proposed by the present invention. That is, the base station calculates the total energy value using energies detected by two correlators included therein.

In step 109, the base station compares the total energy value with a first threshold. If the total energy value exceeds the first threshold, the base station counts the number of received NACK signals in step 110, determining that there is a user terminal that transmitted a NACK signal, among the user terminals. In step 111, the base station compares the counted number of received NACK signals with the limited number of NACK signals. If the counted number of received NACK signals is less than or equal to the limited number of NACK signals, the base station prepares to retransmit the same data packet transmitted in step 101, in step 112.

However, if the counted number of received NACK signals exceeds the limited number of NACK signals, the base station decides to notify transmission failure for the same data packet transmitted in step 101, in step 122. This is to prevent the fall of the entire throughput, because the base station may continuously receive a NACK signal for the transmitted data packet if its reception status with the user terminal is poor.

If the total energy value is less than or equal to the first threshold in step 109, the base station proceeds to step 120.

In step 120, the base station compares a first energy value extracted by its first correlator with a second threshold. The reason for performing the comparison procedure with the first energy value instead of the total energy value is because the terminal that transmitted a NACK signal has been assumed as a terminal with a single antenna. If the first energy value exceeds the second threshold, the base station returns to step 110.

However, if the first energy value is less than or equal to the second threshold, the base station determines the NACK signal received in step 106 as an ACK signal in step 121. That is, the base station proceeds to step 123, determining that there is no terminal that transmitted a NACK signal, among the user terminals that received the data packet.

In step 123, the base station prepares to transmit the next data packet.

Figure 2:
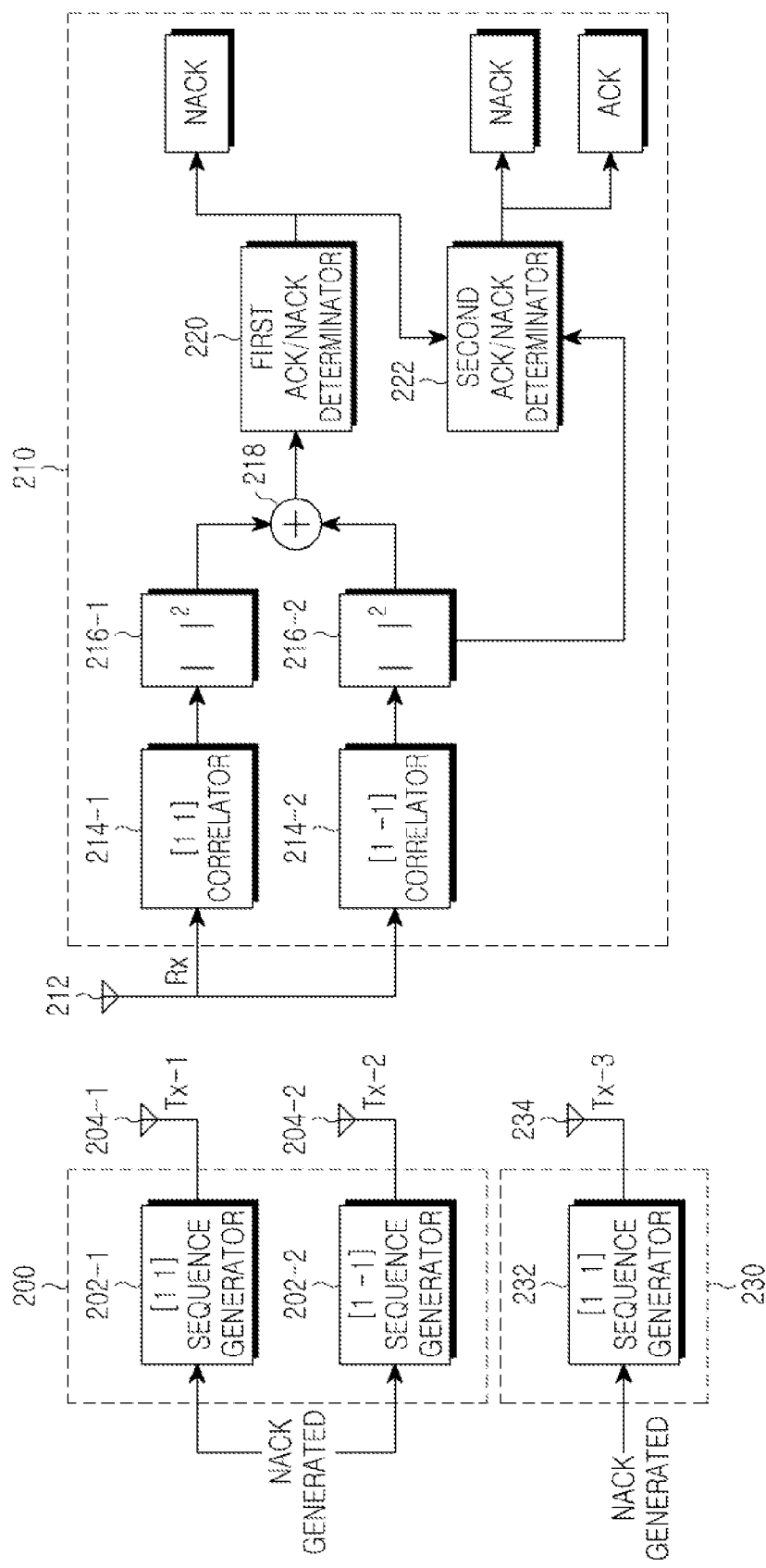
FIG. 2 is a block diagram showing an example of structures of user terminals and a base station according to an embodiment of the present invention.

FIG. 2 shows an example of structures of user terminals and a base station according to an embodiment of the present invention.

Referring to FIG. 2, the communication system includes a first user terminal 200 with two antennas 204-1 and 204-2, a second user terminal 230 with a single antenna 234, and a base station 210.

The first user terminal 200 includes two sequence generators 202-1 and 202-2, and the second user terminal 230 includes one sequence generator 232. Herein, regarding the first user terminal 200 and the second user terminal 230, components other than the parts to which the present invention is applied are not shown in the drawing, and related descriptions will also be omitted.

The first user terminal 200 and the second user terminal 230 each receive a data packet transmitted from the base station 210, through a downlink multicast transmission channel. The data packet is equally received at multiple user terminals including the first user terminal 200 and the second user terminal 230, through the downlink multicast transmission channel.

The first user terminal 200 and the second user terminal 230 each decode the received data packet, and then check the success/failure in the decoding. During the checking, the user terminals check whether the data packet has ever been received and successfully decoded before. If so, the first user terminal 200 and the second user terminal 230 are each controlled to wait for the next data packet.

However, in the case where the received data packet has never been received and successfully decoded before, i.e., it is an initial transmitted data packet, if decoding of the received data packet is failed, the two sequence generators 202-1 and 202-2 each output a NACK signal indicating the decoding failure. The NACK signals are generated with orthogonal sequences, for example, [1 1] and [1 −1], i.e., with two sequences each including two elements, and transmitted to the base station 210 via the associated antennas 204-1 and 204-2. The sequence indicates a signal form used in the shared feedback channel that is transmitted using a shared resource.

Likewise, the one sequence generator 232 outputs a NACK signal. The NACK signal is generated with a sequence [1 1] in the signal form used in the shared feedback channel transmitted using a shared resource, and transmitted to the base station 210 via the antenna 234.

The base station 210 includes a receive antenna 212, correlators 214-1 and 214-2, absolute squarers 216-1 and 216-2, an adder 218, a first ACK/NACK determinator 220, and a second ACK/NACK determinator 222.

The base station 210 receives feedback information indicating the success/failure in decoding the data packet, from the user terminals to which it transmitted the data packet. For example, it is assumed that the base station 210 receives the feedback information from the first user terminal 200 or the second user terminal 230, but the same operation is possible even for other cases. Thereafter, through a comparison procedure performed in the first ACK/NACK determinator 220 and the second ACK/NACK determinator 222, the base station 210 may determine whether the feedback information is an ACK signal or a NACK signal regardless of whether the feedback information has been received from the first user terminal 200 or the second user terminal 230.

The base station 210 receives feedback information transmitted from each of the first user terminal 200 and the second user terminal 230 via the receive antenna 212, and outputs the received feedback information to the correlators 214-1 and 214-2. The correlators 214-1 and 214-2 each detect an associated sequence signal from the feedback information in accordance with two different detection procedures.

Specifically, a first detection procedure detects the sequence signal on the assumption that the feedback information has been received from the first user terminal 200 in the form of orthogonal sequences. That is, the feedback information has been received in the form of a sum of NACK signals, i.e., a sequence signal [1 1] and a sequence signal [1 −1], transmitted from the respective antennas 204-1 and 204-2 of the first user terminal 200. In this case, the correlators 214-1 and 214-2 detect the sequence signal [1 1] and the sequence signal [1 −1] from the received feedback information, and output them to the absolute squarers 216-1 and 216-2, respectively.

The absolute squarers 216-1 and 216-2 each detect energy by squaring an absolute of the input sequence signal, and output the detected energy to the adder 218. The adder 218 calculates the total energy value $\epsilon_{orth}$ by adding up the input energy values, and outputs it to the first ACK/NACK determinator 220.

The first ACK/NACK determinator 220 checks if $\epsilon_{orth}$ exceeds a first threshold, which is determined considering the first user terminal 200 with two antennas. The first ACK/NACK determinator 220 determines the received feedback information as a NACK signal, if $\epsilon_{orth}$ exceeds the first threshold.

If $\epsilon_{orth}$ is less than or equal to the first threshold, the first ACK/NACK determinator 220 outputs an enable signal to the second ACK/NACK determinator 222. In this case, a second detection procedure is performed on the assumption that the feedback information has been received from the second user terminal 230.

The second ACK/NACK determinator 222, connected to the absolute squarer 216-2, previously receives and stores a first energy value $\epsilon_{ook}$, or an energy value of the sequence signal detected by the correlator 214-2. Upon receiving the enable signal from the first ACK/NACK determinator 220, the second ACK/NACK determinator 222 compares $\epsilon_{ook}$ with a second threshold, which is determined considering the second user terminal 230 with a single antenna. If $\epsilon_{ook}$ exceeds the second threshold, the second ACK/NACK determinator 222 determines the received feedback information as a NACK signal. However, if $\epsilon_{ook}$ is less than or equal to the second threshold, the second ACK/NACK determinator 222 determines the feedback information received from the second user terminal 230 as an ACK signal.

As described above, according to an exemplary embodiment of the present invention, the base station includes correlators corresponding to multiple antennas of a user terminal, and can detect feedback information transmitted by the user terminal through a comparison procedure with thresholds corresponding to the number of antennas, regardless of the number of antennas of the user terminal.

Figure 3A:
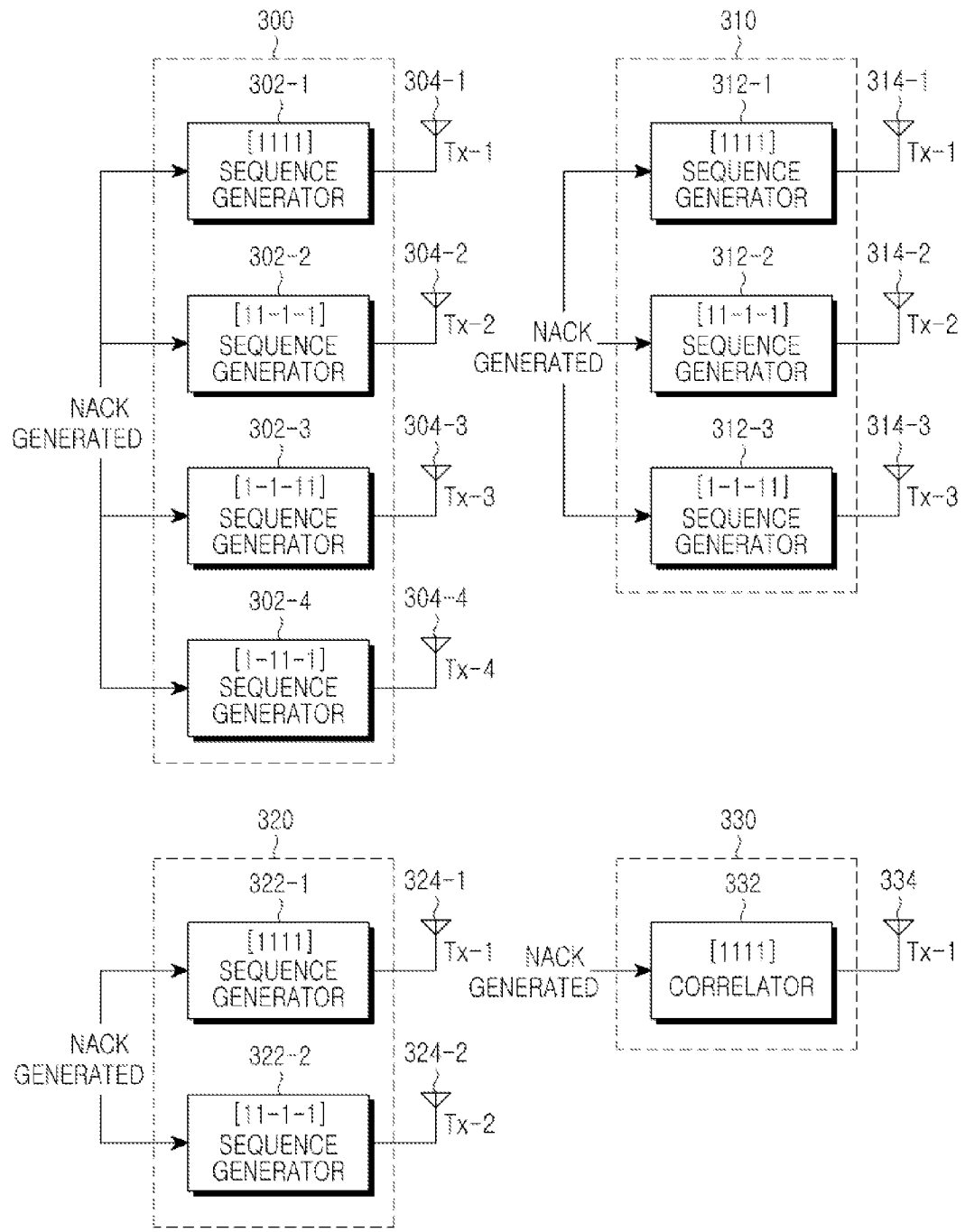
FIGS. 3A and 3B are diagrams showing another example of structures of user terminals and a base station according to an embodiment of the present invention.
Figure 3B:
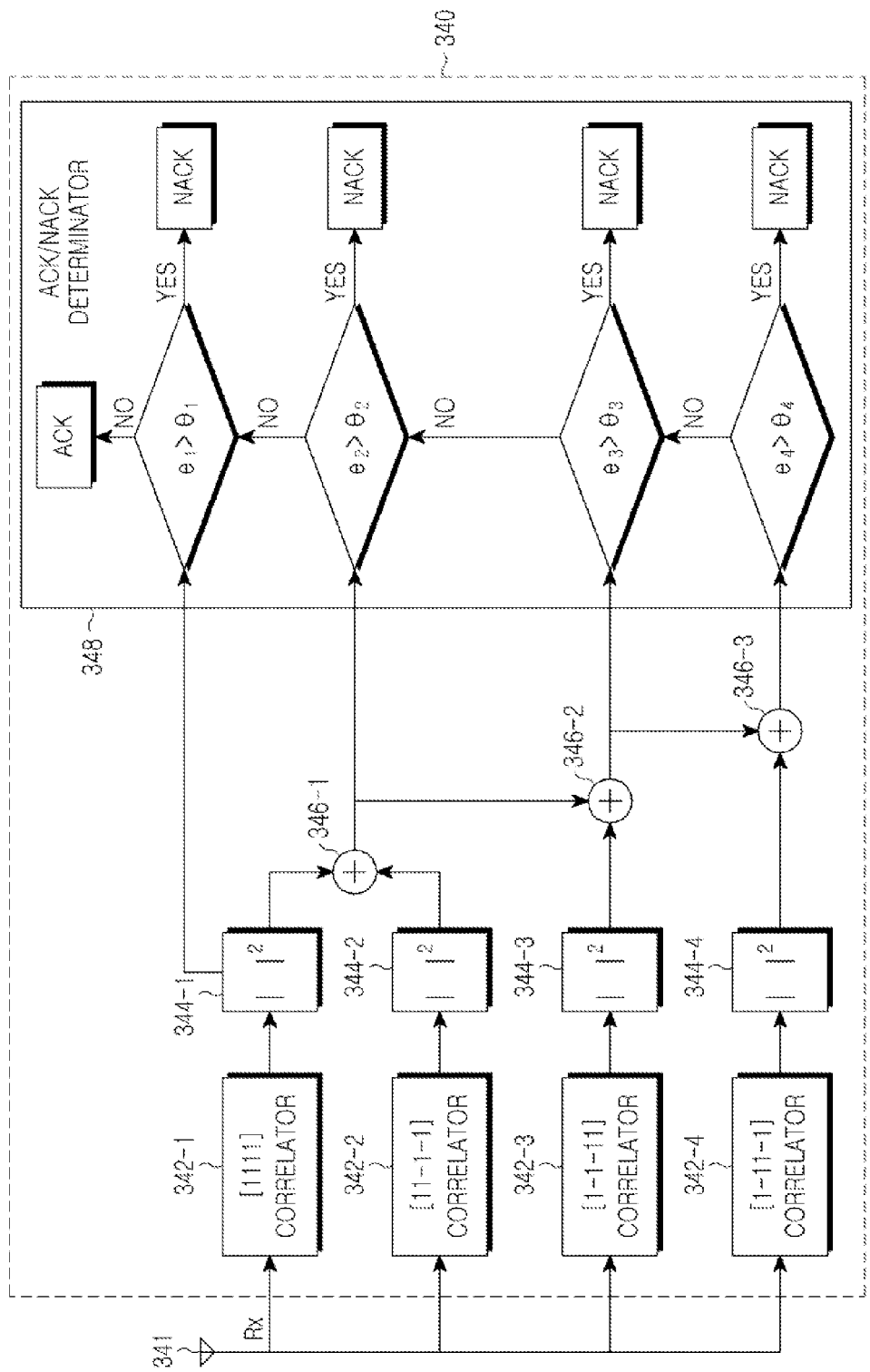

FIGS. 3A and 3B show another example of structures of user terminals and a base station according to an embodiment of the present invention.

Referring to FIG. 3A, the communication system includes a first user terminal 300 with four antennas 304-1~304-4, a second user terminal 310 with three antennas 314-1~314-3, a third user terminal 320 with two antennas 324-1,324-2, and a fourth user terminal 330 with a single antenna 334. Regarding the first to fourth user terminals 300 to 330, components other than the parts to which the present invention is applied are not shown in the drawing, and related descriptions will also be omitted.

The first user terminal 300 includes four sequence generators 302-1~302-4, and the second user terminal 310 includes three sequence generators 312-1~312-3. The third user terminal 320 includes two sequence generators 322-1 and 322-2, and the fourth user terminal 330 includes one sequence generator 332.

The first to fourth user terminals 300 to 330 each receive a data packet transmitted from a base station 340 shown in FIG. 3B through a downlink multicast transmission channel. The data packet is equally received at multiple user terminals including the first to fourth user terminals 300 to 330 through the downlink multicast transmission channel.

The first to fourth user terminals 300 to 330 each decode the received data packet, and then check the success/failure in the decoding. During the checking, the user terminals check if the data packet has ever been received and successfully decoded before. If so, the first to fourth user terminals 300 to 330 each wait for the next data packet, determining that the data packet is an initial transmitted data packet.

In the case where the first user terminal 300 determines that the data packet has never been received and successfully decoded before, if decoding of the received data packet is failed, each of the four sequence generators 302-1~302-4 in the first user terminal 300 outputs a NACK signal indicating the decoding failure. The NACK signals are generated with orthogonal sequences, for example, [1 1 1 1], [1 1 −1 −1], [1 −1 −1 1] and [1 −1 −1], i.e., with four mutually orthogonal sequences each including four elements, and transmitted to the base station 340 via the associated antennas 304-1~304-4.

In the case where the second user terminal 310 determines that the received data packet has never been received and successfully decoded before, if decoding of the received data packet is failed, each of the three sequence generators 312-1~312-3 outputs a NACK signal indicating the decoding failure. The NACK signals are generated with orthogonal sequences, for example, [1 1 1 1], [1 1 −1 −1] and [1 −1 1 −1], i.e., with three mutually orthogonal sequences each including four elements, and transmitted to the base station 340 via the associated antennas 314-1~314-3.

In the case where the third user terminal 320 determines that the received data packet has never been received and successfully decoded before, if decoding of the received data packet is failed, each of the two sequence generators 322-1 and 322-2 outputs a NACK signal. The NACK signals are generated with orthogonal sequences, for example, [1 1 1 1] and [1 1 −1 −1], i.e., with two mutually orthogonal sequences each including four elements, and transmitted to the base station 340 via the associated antennas 324-1 and 324-2.

Finally, in the case where the fourth user terminal 330 determines that the received data packet has never been received and successfully decoded before, if decoding of the received data packet is failed, the one sequence generator 332 outputs a NACK signal indicating the decoding failure. The NACK signal is generated with a sequence, for example, [1 1 1 1], i.e., with one sequence including four elements, and transmitted to the base station 340 via the associated antenna 334.

Referring to FIG. 3B, the base station 340 includes a receive antenna 341, four correlators 342-1~342-4, absolute squarers 344-1~344-4, adders 346-1~346-3, and an ACK/NACK determinator 348.

The base station 340 receives feedback information indicating the success/failure in decoding the data packet, from the user terminals to which it transmitted the data packet. For example, it is assumed that the base station 340 receives the feedback information from one of the first to fourth user terminals 300 to 330, but the same operation is possible even for other cases. Thereafter, through a comparison procedure performed in the ACK/NACK determinator 348, the base station 340 may determine whether the feedback information is an ACK signal or a NACK signal regardless of whether the feedback information has been received from any user terminal among the first to fourth user terminals 300 to 330.

The base station 340 receives feedback information transmitted from the first to fourth user terminals 300 to 330 via the receive antenna 341, and outputs it to the correlators 342-1~342-4.

The first correlator 342-1 detects a first sequence signal [1 1 1 1], and outputs it to the first absolute squarer 344-1. The first absolute squarer 344-1 calculates a first energy value $e_1$, or an energy value of the first sequence signal, by squaring an absolute of the detected first sequence signal, and outputs it to the first adder 346-1 and the ACK/NACK determinator 348. The ACK/NACK determinator 348 stores $e_1$ to use it in a fourth detection procedure.

The second correlator 342-2 detects a second sequence signal [1 1 −1 −1], and outputs it to the second absolute squarer 344-2. The second absolute squarer 344-2 calculates a second energy value, or an energy value of the second sequence signal, by squaring an absolute of the detected second sequence signal, and outputs it to the first adder 346-1. The first adder 346-1 outputs a sum $e_2$ of the first energy value and the second energy value to the second adder 346-2 and the ACK/NACK determinator 348. The ACK/NACK determinator 348 stores $e_2$ to use it in a third detection procedure.

The third correlator 342-3 detects a third sequence signal [1 −1 −1 1], and outputs it to the third absolute squarer 344-3. The third absolute squarer 344-3 calculates a third energy value, or an energy value of the third sequence signal, by squaring an absolute of the detected third sequence signal, and outputs it to the second adder 346-2. The second adder 346-2 outputs a sum $e_3$ of the $e_2$ and the third energy value to the third adder 346-3 and the ACK/NACK determinator 348. The ACK/NACK determinator 348 stores $e_3$ to use it in a second detection procedure.

The fourth correlators 342-4 detects a fourth sequence signal [1 −1 1 −1], and outputs it to the fourth absolute squarer 344-4. The fourth absolute squarer 344-4 calculates a fourth energy value, or an energy value of the fourth sequence signal, by squaring an absolute of the detected fourth sequence signal, and outputs it to the third adder 346-3. The third adder 346-3 outputs a sum $e_4$ of the $e_3$ and the fourth energy value to the ACK/NACK determinator 348. The ACK/NACK determinator 348 stores $e_4$ to use it in a first detection procedure.

The ACK/NACK determinator 348 may determine whether the feedback information that the base station 340 has received from the user terminals is an ACK signal or a NACK signal according to the following four different procedures, regardless of the number of antennas of the user terminal that transmitted the feedback information.

As for the first procedure, it is assumed that the feedback information has been received from the first user terminal 300 in the form of four orthogonal sequences.

The ACK/NACK determinator 348 determines if the $e_4$ exceeds a fourth threshold $\theta_4$, which is determined considering the user terminals with four antennas.

If the $e_4$ exceeds the $\theta_4$, the ACK/NACK determinator 348 determines the received feedback information as a NACK signal. However, if $e_4$ is less than or equal to the $\theta_4$, the ACK/NACK determinator 348 proceeds with the second procedure.

As for the second procedure, it is assumed that the feedback information has been received from the second user terminal 310 in the form of three orthogonal sequences.

The ACK/NACK determinator 348 determines whether the $e_3$ exceeds a third threshold $\theta_3$, which is determined considering the user terminals with three antennas.

If the $e_3$ exceeds the $\theta_3$, the ACK/NACK determinator 348 determines the received feedback information as a NACK signal.

However, if the $e_3$ is less than or equal to the $\theta_3$, the ACK/NACK determinator 348 proceeds with the third procedure.

As for the third procedure, it is assumed that the feedback information has been received from the third user terminal 320 in the form of two orthogonal sequences.

The ACK/NACK determinator 348 determines whether the $e_2$ exceeds a second threshold $\theta_2$, which is determined considering the user terminals with two antennas.

If the $e_2$ exceeds the $\theta_2$, the ACK/NACK determinator 348 determines that the received feedback information as a NACK signal. However, if the $e_2$ is less than or equal to the $\theta_2$, the ACK/NACK determinator 348 proceeds with the last fourth procedure.

As to the fourth procedure, it is assumed that the feedback information has been received from the fourth user terminal 330 in the form of a sequence modulated using the OOK modulation technique.

The ACK/NACK determinator 348 determines whether the $e_1$ exceeds a first threshold $\theta_1$, which is determined considering the user terminals with a single antenna. If the $e_1$ exceeds the $\theta_1$, the ACK/NACK determinator 348 determines the received feedback information as a NACK signal.

If the $e_1$ is less than or equal to the $\theta_1$, the ACK/NACK determinator 348 determines that the received feedback signal is an ACK signal.

Through the foregoing operation, the base station can detect feedback information transmitted by a user terminal, regardless of the number of antennas of the user terminal.

The first to fourth thresholds mentioned in this application are determined considering the probability of miss detection and false alarm on the feedback information that the user terminals transmitted. The miss detection occurs when the feedback information is misjudged as an ACK signal though it was indicating a NACK signal, and the false alarm occurs when the feedback information indicating the ACK signal is misjudged as a NACK signal.

As described above, in embodiments of the present invention, only the feedback method has been described, assuming that the user terminal has already acquired allocation information for a shared feedback channel over which it is to transmit feedback information.

Actually, the user terminal can acquire allocation information for the shared feedback channel over which it will transmit the feedback information, using the following methods.

In a first method, the base station allocates a shared feedback channel over which it transmits its downlink multicast data packet and receives feedback information transmitted from the user terminals in response thereto. The base station transmits the allocated shared feedback channel to the user terminals using separate control information. The user terminals receive the shared feedback channel information by decoding the control channel.

In a second method, locations of feedback resources are 1:1 mapped previously depending on a resource allocation message for the multicasted data packet, or a value of logical or physical resources occupied by the transmitted data packet. The mapping information is previously shared by all the user terminals and the base station. Then, the user terminal acquires information about the shared feedback channel to be used for transmission of feedback information with use of the previously recognized mapping information without separately decoding the downlink message.

As is apparent from the foregoing description, according to exemplary embodiments of the present invention, the user terminals with a single antenna and the user terminals with multiple antennas transmit feedback information in a combined manner using the shared feedback channel method. Then, the base station detects the received feedback information considering the number of antennas of each of the user terminals. Therefore, the base station can efficiently detect feedback information of a specific user terminal regardless of the number of antennas of the user terminal, contributing to efficient management of the entire frequencies.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for receiving feedback information by a base station in a communication system including user terminals with different numbers of antennas, the method comprising:

transmitting a data packet to the user terminals through a downlink multicast transmission channel;

receiving feedback information indicating success/failure in decoding the data packet through a shared feedback channel from at least one user terminal that has received the data packet, among the user terminals;

detecting from the feedback information each of sequences, the number of which is equal to the largest number n (where n is an integer greater than or equal to 2) among the numbers of antennas of the at least one user terminal;

calculating an energy value of each of the detected sequences, calculating a first total energy determined by adding up all the calculated energy values, and then comparing the first total energy with a first threshold;

determining the feedback information as a NACK signal, if the first total energy exceeds the first threshold;

checking whether n-1 is 1, if the first total energy is less than or equal to the first threshold;

comparing a second energy, which is one of the calculated energy values, with a second threshold, if n-1 is 1;

determining the feedback information as a NACK signal if the second energy exceeds the second threshold, and determining the feedback information as an ACK signal if the second energy is less than or equal to the second threshold;

(a) if n-1 is not 1, comparing a third total energy, which is a sum of (n-1) energy values among the calculated energy values, with a third threshold;

(b) determining the feedback information as a NACK signal, if the third total energy exceeds the third threshold;

(c) returning to step (a) after decreasing a value of n by 1, if the third total energy is less than or equal to the third threshold; and allocating the shared feedback channel to the user terminals, and transmitting channel information for the allocated shared feedback channel to the user terminals through a control channel, wherein the first threshold is determined considering n transmit antennas and corresponding feedback sequences, the first total energy is a sum of correlator outputs correspond to n different sequences, and the sequences are mutually orthogonal, wherein the second threshold is determined considering one transmit antenna and corresponding feedback sequence, and wherein the third threshold is determined considering n-1 transmit antennas and corresponding feedback sequences after decreasing a value of n by 1 in step (c).

2. The method of claim 1, wherein the first to third thresholds are determined considering a probability of miss detection and false alarm;

wherein the miss detection occurs when feedback information indicating a NACK signal is misjudged as an ACK signal, and the false alarm occurs when feedback information indicating an ACK signal is misjudged as a NACK signal though it was an ACK signal.

3. An apparatus for receiving feedback information in a communication system including user terminals with different numbers of antennas, the apparatus comprising:

a base station for transmitting a data packet to the user terminals through a downlink multicast transmission channel, for receiving feedback information indicating success/failure in decoding the data packet from at least one user terminal that has received the data packet, among the user terminals, through a shared feedback channel, for detecting from the feedback information each of sequences, the number of which is equal to the largest number n (where n is an integer greater than or equal to 2) among the numbers of antennas of the at least one user terminal, for calculating an energy value of each of the detected sequences, for calculating a first total energy determined by adding up all the calculated energy values, for comparing the first total energy with a first threshold, and for determining the feedback information as a NACK signal, if the first total energy is less than or equal to the first threshold, for comparing a second energy, for determining whether n-1 is 1, which is one of the calculated energy values, with a second threshold if n-1 is 1, for determining the feedback information as a NACK signal if the second energy exceeds the second threshold, for determining the feedback information as an ACK signal, if the second energy is less than or equal to the second threshold, (a) if n-1 is not 1, for comparing a third total energy, which is a sum of (n-1) energy values among the calculated energy values, with a third threshold, (b) for determining the feedback information as a NACK signal, if the third total energy exceeds the third threshold, (c) for returning to step (a) after decreasing a value of n by 1, if the third total energy is less than or equal to the third threshold, and for allocating the shared feedback channel to the user terminals, and for transmitting channel information for the allocated shared feedback channel to the user terminals through a control channel, wherein the first threshold is determined considering n transmit antennas corresponding feedback sequences, the first total energy is a sum of correlator outputs correspond to n different sequences, and the sequences are mutually orthogonal, wherein the second threshold is determined considering one transmit antenna and corresponding feedback sequence, and wherein the third threshold is determined considering n-1 transmit antennas and corresponding feedback sequences after decreasing a value of n by 1 in step (c).

4. The apparatus of claim 3, wherein the first to third thresholds are determined considering a probability of miss detection and false alarm;

wherein the miss detection occurs when feedback information indicating a NACK signal is misjudged as an ACK signal, and the false alarm occurs when feedback information indicating an ACK signal is misjudged as a NACK signal though it was an ACK signal.

* * * * *